Patented May 3, 1927.

1,627,326

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

FREQUENCY-CHANGING AGGREGATE.

Application filed August 6, 1923. Serial No. 655,900.

My invention relates to a phase or frequency changing aggregate and it has for its principal object to provide combinations of a plurality of induction machines of different pole numbers adapted to exchange electrical energy between electrical systems operating on several frequencies.

A more specific object of my invention is to provide a frequency-changing system utilizing a pair of cascade-connected induction machine units which have different pole numbers, and either one of which may be connected as the first member of the cascade, whereby different frequencies may be obtained.

A further object of my invention is to provide a mechanism of the character just described which shall also be adapted to operate, at times, as a phase converter.

A still further object of my invention is to provide a novel control apparatus and a novel method of operating induction motors, with particular application to the variable-speed operation of polyphase induction motors deriving power from a single-phase constant-frequency source.

It is generally agreed that alternating-current locomotives having polyphase induction motors as driving units and an energy supply from a single-phase source of standard frequency would be most desirable for railway operation. I have found that, by the combination of induction-machine units of different pole-members and by the use of either one of the units as the first member of a cascade connection, a very efficient and simple frequency-changing aggregate may be obtained, which is very well adapted for the economical operation of induction motors at a large number of different speeds, besides having many other applications.

I have further found that a frequency-changing aggregate of the above type may be used in connection with a single-phase system and a polyphase system as a combined frequency changer and phase converter and it presents, accordingly, a particularly good solution of the above-stated problem in connection with railway electrification.

The foregoing and other novel features of my invention will be more readily understood by reference to the accompanying drawing, wherein.

Figure 1:
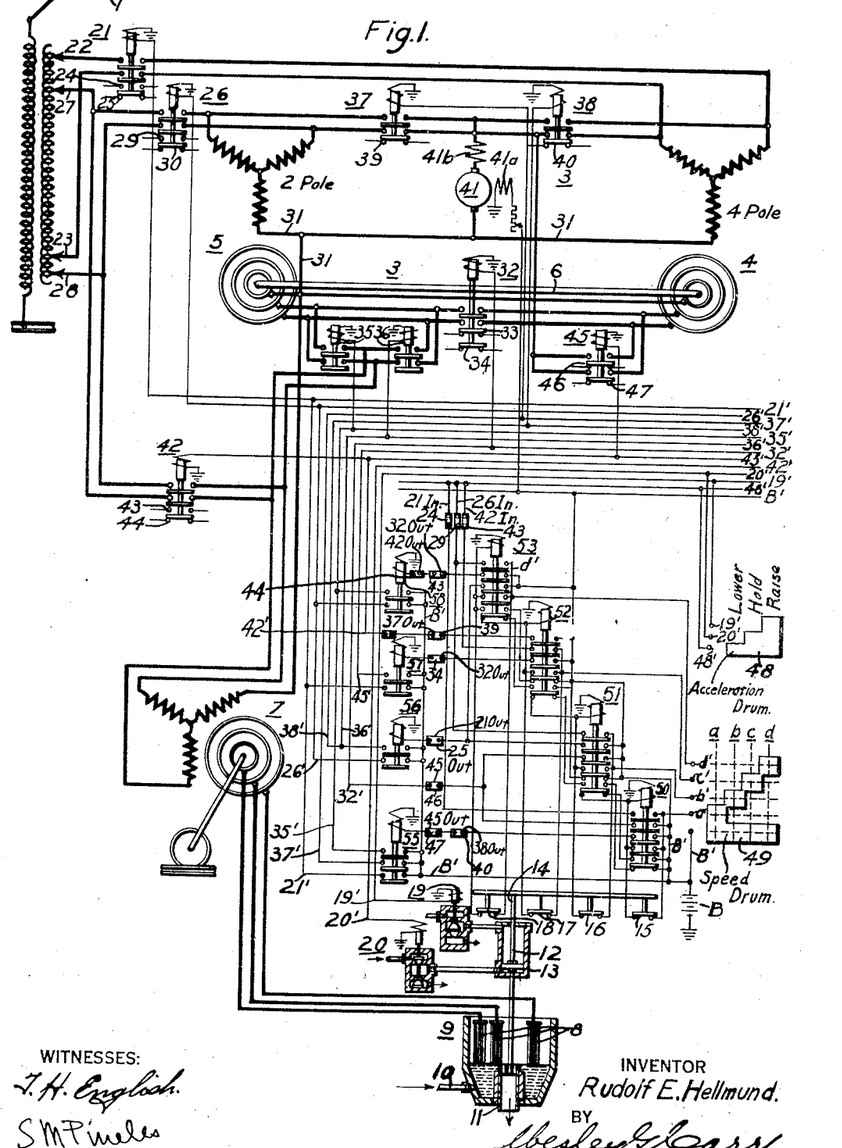
Figure 1 is a diagrammatic view of circuits and apparatus embodying my invention in a system for the speed control of a polyphase induction motor or motors supplied from a single-phase line.

In the system shown in Fig. 1, power is supplied from an overhead conductor 1 to a transformer 2 which may be placed upon a locomotive or other railway vehicle. The transformer energizes a combined phase and frequency converter aggregate 3 comprising a four-pole induction machine 4 and a two-pole induction machine 5, said machines having their rotors mounted on a common shaft 6.

From the combined phase and frequency converting aggregate 3, power is supplied to a propulsion motor or motors 7, of the induction-motor type, having secondary windings connected to stationary electrodes 8 of a liquid rheostat or rheostats 9. While any type of rheostat may be employed, I have illustrated one in which the electrolyte is continuously circulating, entering through a duct 10 and leaving the rheostat through a sliding outlet sleeve 11. The outlet sleeve may be raised or lowered, to control the height of the electrolyte, by means of a piston 12 moving in a cylinder 13 and having a piston rod 14 which carries a plurality of interlock switches 15, 16, 17 and 18 which are closed when the outlet sleeve valve is in its lowest position. Compressed air is admitted to the upper and the lower ends of the cylinder 13 through electro-magnetically operated air valves 19 and 20, respectively.

The induction machines 4, 5 and 7 are all illustrated as three-phase machines. Two phases of the four-pole converter machine 4 may be connected, by means of an electro-magnetic switch 21, to two adjustable taps 22 and 23 on the transformer 2. The switch 21 is provided with auxiliary contact members or interlocks 24 and 25 which are closed, respectively, when the switch is closed and when the switch is open.

Two phases of the two-pole converter machine 5 may be connected, through an electro-magnetic switch 26, to two adjustable transformer taps 27 and 28 which are adjacent to the taps 22 and 23, respectively. The switch 26 is also provided with interlocking switches 29 and 30 which are similar to the interlocking switches 24 and 25, respectively. For convenience in illustration, the remaining phases of the primary windings of the two machines 4 and 5 are connected together and to one phase of each of the secondary windings of such machines, as well as to one phase of the primary windings of the propulsion motor 7, by means of permanent connecting conductors 31.

The two remaining secondary phases of the four-pole machine 4 may be connected to the two remaining secondary phases of the two-pole machine 5 by means of an electro-magnetic switch 32 having auxiliary interlocking contact members 33 and 34, both of which are closed when the switch is in the open position. The last-mentioned secondary phases of the two-pole machine 5 may be connected to the two remaining phases of the primary windings of the propulsion motor 7, by means of either one of two oppositely connected electro-magnetic switches 35 and 36.

The primary windings of either the two-pole machine 5 or the four-pole machine 4 may be short-circuited, by means of electro-magnetic switches 37 and 38, respectively, having interlock contacts 39 and 40, respectively, which are closed when the switches are open. The interlocking connections are so arranged that the closed circuit of one of the phases includes the armature of a direct-current exciting machine 41 having a direct-current field winding 41a and a compensating or neutralizing winding 41b for permitting the free passage of alternating currents therethrough. The provision of the exciter machine 41 makes possible the correction of the power factor of the converter aggregate 3.

The two above-mentioned primary phases of the propulsion motor 7 may also be energized directly from the adjustable taps 27 and 28 of the transformer 2 by means of an electro-magnetic switch 42 that is provided with a pair of auxiliary contact members 43 constituting an interlocking switch which is closed when the main switch contact members are closed and a second pair of auxiliary contact members 44 constituting an interlocking switch that is closed when the main switch contact members are open, in a manner similar to the interlocking switches 24 and 25 of the switch 21.

The main switching connections of the organization are completed by means of an electro-magnetic switch 45 which short-circuits the secondary windings of the four-pole machine 4, the connections being so arranged that the exciter machine 41 is included in the short-circuiting connections of one phase. The switch 45 is provided with auxiliary interlocking switches 46 and 47 both of which are closed when the main switch 45 is open.

By means of the organization thus provided, four main running-speed connections of the propulsion motor 7 are provided.

Figure 2:
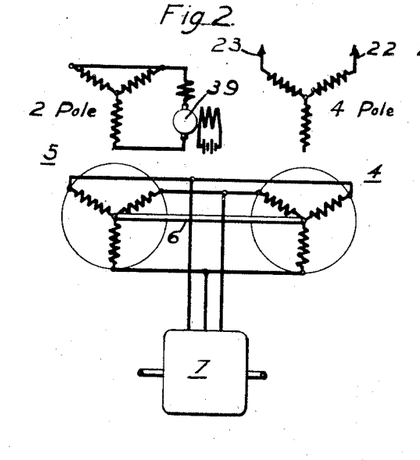
Figs. 2, 3, 4 and 5 are simplified diagrammatic views illustrating successive steps in the operation of my system of motor control.

For the lowest-speed running conditions, as shown in Fig. 2, the machines 4 and 5 are connected as a cascade motor set with the four-pole machine 4 energized from the transformer 2 and with the motor 7 energized from the cascading connections. The converter aggregate 3 will then operate at two-thirds of the synchronous speed of the four-pole machine and hence the secondary currents that are supplied to the propulsion motor have one-third of the line frequency of the transformer 2. The short-circuited machine 5 operates as a phase-balancer. Switches 21, 37, 32 and 35 are closed to establish the connections just described.

Figure 3:
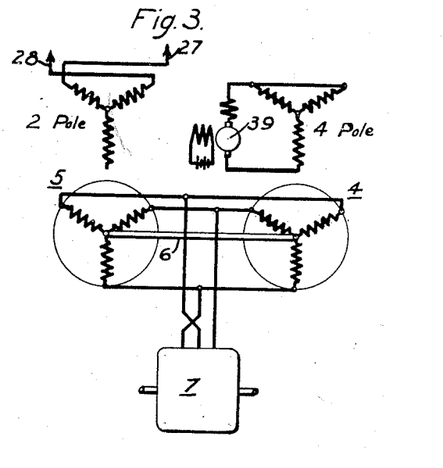

In the second running-speed connection, as shown in Fig. 3, the machines 4 and 5 are again connected as a cascade motor set but with the two-pole machine 5 energized from the line instead of the four-pole machine. With respect to the synchronous speed of the two-pole machine, the speed of the cascade set is only one-third, and hence the slip frequency is two-thirds of the line frequency, causing the propulsion motor 7 to operate at substantially twice its previous speed. Two of the motor phases are reversed with respect to the connections in Fig. 2, in order to maintain the same directions of rotation, since the rotation of the field relative to the rotor of the machine 5 is contrary to the direction of rotation of the rotor when operating with the connections of Fig. 2 and in the direction of rotation of the rotor when operating with the connections of Fig. 3. Switches 26, 38, 32 and 36 are closed to establish the connections just described.

Figure 4:
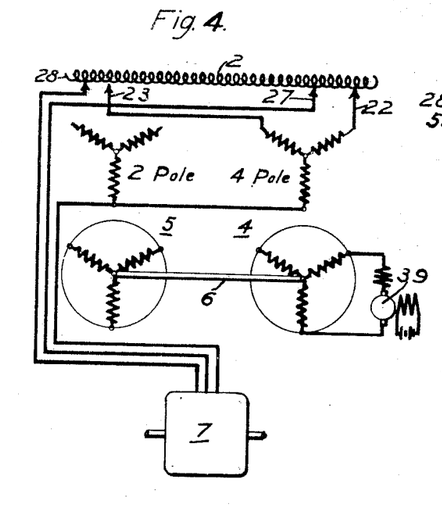

For the third running-speed conditions, as shown in Fig. 4, the propulsion motor is energized directly from the line and from the primary windings of the four-pole machine 4 operating as a phase converter. Switches 21, 45 and 42 are closed to establish the connections just described.

Figure 5:
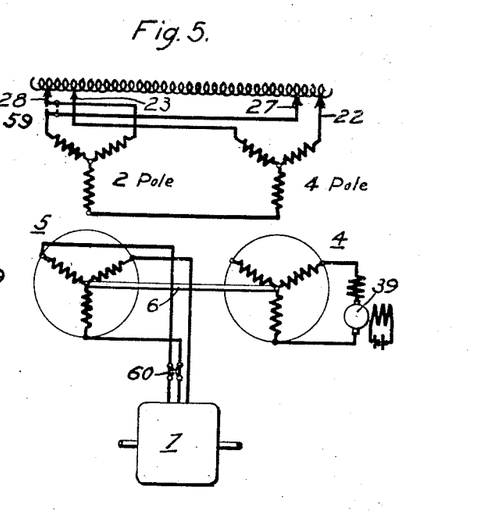

For the highest running-speed condition, as shown in Fig. 5, the four-pole machine 4 operates as a motor driving the two-pole machine 5 as a generator, the connections being such that the primary windings of the two-pole machine 5 are supplied with three-phase, line-frequency currents establishing a magnetic field rotating backwardly with respect to the mechanical rotation of the secondary windings of the machine, whereby currents having substantially one and onehalf times the line frequency are generated in the secondary windings of said two-pole machine and thence supplied to the propulsion motor 7. Switches 21, 45, 26 and 35 are closed to establish the connections just described.

I have thus provided an organization in which the speed of the propulsion induction motor or motors 7 may be increased in four fairly uniform steps providing for easy acceleration and also providing for four convenient running speeds in which rheostatic losses are entirely avoided. Intermediate or transition speeds are best obtained, in the illustrated embodiment of my invention, by the insertion of resistances in the secondary winding connections of the motor or motors.

In the practical operation of the combinations just described, it is essential, in order to avoid an altogether too sudden acceleration of the propulsion motor, to so interlock the secondary rheostat 9, or equivalent torque-controlling means, such as primary voltage control by means of the transformer taps 22, 23, 27 and 28, with the respective speed-changing switches that the primary speed connections cannot be changed except when the electrolyte in the rheostat occupies a relatively low position, or, in general, when the torque-controlling means is in a low-torque position. It is also desirable that the current consumption of the main propulsion motor be reduced to a low value before the primary connections are opened, in order to save wear on the primary switch contact members during the switching operation and, for this reason, I have illustrated my invention in a system wherein the electrolyte of the liquid rheostat must be lowered to its extreme low position before any of the main switching contacts may be opened. I shall now describe the illustrated control system for carrying out my invention but I wish it to be distinctly understood that my improvements, in their broadest aspects, are not necessarily limited to any particular type of control apparatus or to any particular type of secondary motor rheostat.

Two controlling drums are provided for securing the main running speeds and transition speeds of the propulsion motor 7. An acceleration drum 48 is provided with three stationary contact members 19′, 20′ and 48′, whereby the electro-magnetic valves 19 and 20 may be energized from the line 48′ in order to raise or lower the electrolyte in the liquid rheostat 9. It will be observed that when both valves 19 and 20 are de-energized air under pressure is admitted to the top of the cylinder 13 through the valves 19, while the bottom end of the cylinder is connected to the atmosphere through the valve 20. When both valves 19 and 20 are energized, compressed air is released from the top of the cylinder and applied to the bottom of the cylinder whereby the sleeve valve 11 of the rheostat is raised. When the valve 20 is energized alone, pressure is applied to both sides of the piston 12 within the cylinder 13 and the height of the electrolyte within the liquid rheostat is held constant in any position.

A so-called "speed drum" 49 is provided for effecting the primary speed-changing connections. I have shown the speed drum 49 as being associated with four auxiliary electromagnetic switches 50, 51, 52 and 53, energized from stationary contact members $a'$, $b'$, $c'$, $d'$, respectively, which are successively connected to a stationary contact B′ of a battery B in the successive positions $a$, $b$, $c$ and $d$ of the speed drum 49.

The auxiliary switches 50, 51, 52 and 53 are energized from the contactors $a'$, $b'$, $c'$ and $d'$ through the interlocks 15, 16, 17 and 18, respectively, which prevent the closure of any of said auxiliary switches until the electrolyte of the liquid rheostat is in its lowest position. The respective interlocks 15, 16, 17 and 18 are shunted by interlocks "50-in," "51-in," "52-in" and "53-in," whereby the respective switches are locked in closed position so long as the speed drum is left in the same position, notwithstanding the subsequent elevation of the electrolyte in the liquid rheostat.

There is also an auxiliary energizing circuit, directly from the battery B, for each of the switches 50, 51, 52 and 53 whereby each switch, when once energized, is held closed so long as the next adjacent switch or switches, as the case may be, are in open position, notwithstanding the position of the speed drum. By this means it is impossible to break the contacts controlled by any one of the four switches 50, 51, 52 or 53 in case the speed control drum should be improperly operated in a rapid manner without allowing time for the liquid rheostat 9 to empty and for the proper primary connections to be established.

The auxiliary switches 50 to 53 are illustrated as controlling additional contactor switches 55, 56, 57 and 58, each of which, in turn, energizes a plurality of the nine main-circuit switches 21, 26, 37, 38, 35, 36, 32, 45 and 42. It will be understood, however, that the four switches 55 to 58 and their associated main-circuit switches might be replaced by four switches for making the main-circuit connections directly, or by any equivalent means for performing the functions of the intermediate switches.

The nature of the respective control switch connections may best be described by outlining the operations which occur upon the manipulation of the speed drum 49. When the locomotive is placed in condition for operation, the converter aggregate 3 is first started up and connected to the single-phase supply line by any convenient means (not shown). It is contemplated that the converter aggregate, when once started, shall not be stopped, regardless of the position of the speed drum 49. The means and methods suitable for starting and stopping the converter aggregate are well known in the art and are not necessary to an understanding of the present invention, and, hence, the switching mechanism therefor is not illustrated.

Assuming the locomotive to be at standstill, and the speed drum 49 brought into its first position $a$, then the switch 50 will be energized through the circuit B—B', 49-$a'$ and 15, after which it will be held energized through the holding circuit B—B', "50-in" and "51-out". A circuit will then be closed from the battery B, through B', "50-in", "38-out" and "45-out", to the operating coil of the switch 55, whereby the line conductors 21', 37' and 35' of the correspondingly numbered main-circuit switches are directly energized from the battery B. The interlock "45-out" makes it impossible for the switch 55 to be energized so long as the primary speed connections for the third and fourth running speeds are established, while interlock "38-out" makes it impossible for the switch 55 to be energized while the primary connections for the second running speed are established.

When the switch 50 is in closed position, a circuit is also completed from the battery B, through B', "50-in" and "45-out", to the line conductor 32' of the main-circuit switch 32, whereby the latter is directly energized from the battery B. Since the switch 32 is to be closed in both the first and the second running speed conditions of the aggregate, it is necessary for the connections to be protected only by the "45-out" interlock to prevent the energization of said switch 32 when the main circuit connections are made for the third and fourth running speeds.

When the speed drum 49 is in its first position $a$ and the switch 50 is in closed position, a circuit is also completed from the battery B, through the speed drum 49, the contact $a'$ and the interlocks "50-in" and "21-in", to the line conductor 48' of the accelerating drum 48, whereby the electrolyte of the liquid rheostat 9 is maintained in its lowest position unless and until the switch 21 is closed by the auxiliary switch 55, whereupon the height of the electrolyte may be controlled by the position of the accelerating drum 48.

As soon as the speed-control drum 49 is moved to its second position $b$, the stationary contact $a'$ is de-energized and hence the accelerating-drum conductor 48' is de-energized. The electromagnetic valves 19 and 20 are thus deenergized, regardless of the position of the accelerating drum 48, and the electrolyte of the liquid rheostat is caused to fall to its lowest position.

When the interlock 16 of the rheostat is closed and the speed drum 49 is in the position $b$, a circuit is completed from the battery B, through the speed drum 49, the contact $b'$ and said interlock 16, to the switch 51, and the switch 51 energized. The holding circuit, B—B', "50-in" and "51-out", of the switch 50 is then broken and the switch 50 is de-energized. The main-circuit switch 32 is held in closed position through a circuit B—B', "51-in" and "45-out". The switch 55, however, is opened upon the opening of switch 50 and hence the main-line switches 21, 37 and 35 are de-energized. The switch 56 is then energized, through a circuit B—B', "51-in" and "21-out", the interlock "21-out" preventing the energization of the switch 56 when the main-line switches are connected for either the first, third or fourth running speed. The switch 56 energizes the line conductors 36', 38' and 26' of the correspondingly numbered main-circuit switches. The acceleration-drum conductor 48', which was de-energized upon the de-energization of the contact member $a'$, is thereupon re-energized through a circuit B—B', 49-$b'$, "51-in" and "26-in".

When the speed drum is moved to its third position $c$, the contact $b'$ is de-energized, thus de-energizing the line conductor 48' of the acceleration drum and causing the electrolyte of the liquid rheostat to occupy its lowest position. A circuit is thereupon completed from the battery B, through the speed drum 49, the contact member $c'$ and the interlock switch 17 of the rheostat 9, to the actuating coil of the switch 52 and the switch 52 closed. Upon closure of the switch 52, the holding circuit, B—B', "50-out", "51-in" and "52-out", of the switch 51 is opened, and the switch 51 de-energized, thus de-energizing the main-circuit switch 32 and the auxiliary switch 56, together with the corresponding main-circuit switches 26, 36 and 38.

When the switch 52 is in closed position, a circuit is completed from the battery B, through conductor B' and the interlocks "52-in" and "32-out", to the switch 57, thus energizing the line conductors 21' and 45' of the correspondingly numbered main-circuit switches. The interlock "32-out" prevents the energization of the switch 57 when the main connections for either the first or second running speeds are established. A circuit is established also from the battery B, through the conductor B' and the interlocks "52-in", "37-out" and "26-out", to the line conductor 42' of the switch 42, the interlock "26-out" preventing the switch 42 from being closed when the circuit connections for either the second or fourth running speeds are established, and the interlock "37–out" preventing the switch 42 from being closed when the circuit connections are established for the first running speed. The accelerating-drum conductor 48', which was de-energized upon the de-energization of the contact b', is thereupon re-energized through the circuit B—B', 49–c', "52–in" and "42–in".

When the speed drum is moved to its fourth position d, the contact c' is de-energized, thus de-energizing the accelerating-drum conductor 48' and causing the electrolyte of the liquid rheostat to occupy its lowest position. A circuit is thereupon established from the battery B, through the conductor B', the accelerating drum 49, the contact member d' and the interlock 18 of the rheostat 9, to the actuating coil of the switch 53. When the switch 53 closes, the retaining circuit, B—B', "51–out", "52–in" and "53–out", of the switch 52 is de-energized and the main-circuit switch 42 is, therefore, also de-energized. The switch 57 is maintained in energized condition through a circuit B—B', "53–in" and "32–out", so that the main-line switches 21 and 45 remain closed.

When the switch 53 is closed, a circuit is also provided from the battery B, through the conductor B' and the interlocks "53–in", "32–out", and "42–out", to the switch 58, whereby the line conductors 26' and 35' of the correspondingly numbered main-line switches are energized. The interlock "32–out" prevents the closure of the switch 58 when the main-circuit connections are established for the first or second running speed, while the interlock "42–out" prevents the closure of the switch 58 while the main-circuit connections are established for the third running speed.

When the switch 53 is closed and the main-line switch 26 is closed, the accelerating-drum conductor 38', which was de-energized upon the de-energization of the contact c', is re-energized through the circuit B—B', 49–d', "53–in" and "26–in".

The operation upon the reverse movement of the speed drum 49 will now be obvious. The propulsion motor, or motors, will regenerate as induction generators whenever the motor speed exceeds the synchronous speed for the particular primary connections which are established therefor.

The various interlocks are so arranged that the acceleration drum 48 may be left continuously on its third or "Raise" position, whereby the line conductors 19' and 20' of the electro-magnetic valves 19 and 20 are constantly connected to the acceleration-drum conductor 48', in condition for raising the electrolyte in the liquid rheostat 9. The connections are such, however, that the accelerating-drum conductor 48' is de-energized whenever the speed drum is moved from one position to another, and the conductor 48' is not re-energized until the proper primary connections have been established.

The interlocks upon the switches 50 to 53 are so arranged that no switch is de-energized, after having once been energized, until one of the next adjacent switches is energized, and hence, if the accelerating drum is suddenly moved over more than one position before the liquid rheostat has had time to empty, the primary circuit connections will not be broken.

The interlocks in series with the auxiliary switches 55 to 58 and the main-circuit switches 32 and 42 are so arranged that, even though the corresponding switch 50, 51, 52 or 53, is energized, none of the primary or main-circuit switches can be energized unless the main-circuit connections corresponding to all of the other running-speed conditions of the propulsion motor are broken.

It will also be understood that the transformer taps 22, 23, 27 and 28 may be adjusted to perfect the phase-balancing or to vary the applied voltage, the last named function being utilized either in conjunction with, or in place of, the secondary resistance changing steps. Furthermore, the energization of the exciting winding 41a of the direct-current machine 41 may either be left constant or it may be adjusted to obtain any desired power factor under any operating conditions.

In illustrating my invention, I have omitted details which are conventional in all control systems. For simplicity of operation I have shown the converter aggregate 3 as being accelerated from one operating speed to another without the insertion of current-limiting reactors or secondary resistors of any sort. However, in case the resultant current drawn by the converter aggregate during the sudden speed changes from one set of connections to another should be too great, suitable means may obviously be employed, within the scope of my invention, to limit the surge of current in any manner known to those skilled in the art. Such details have been omitted as not essential to an understanding of my present invention.

While I have illustrated the cascade set 3, not as a self-cascaded motor having primary and secondary windings, or winding connections of different pole numbers, but as a set in which the two induction-machine units are separate machines having separate magnetic cores, it will be understood that my invention, in its broader aspects, is not limited to the details of the cascading arrangement so long as the general principles of operation are employed as outlined above. It is unnecessary to extend the illustration with modifications embodying equivalent structures, as such changes will readily suggest themselves to all those skilled in the art. In the appended claims, when I refer to two induction-motor units of different pole numbers, I mean two pairs of primary and secondary windings or their equivalent, each pair operating on the induction-motor principle, whether the units are mounted in separate machines or a single machine.

From the foregoing description, it is seen that, with a pole-number ratio of 2:1, I may obtain frequencies corresponding, respectively to 33%, 67%, 100% and 150% of the line frequency step. In Fig. 5 corresponding to the 150% frequency step, I have also shown a reversing switch 59 in the primary circuit of the two pole machine 5, whereby a 50% frequency will be obtained in the rotor windings, and I have further shown a reversing switch 60 in the primary circuit of the propulsion motor 7, which may be manipulated simultaneously with the switch 57 in order to preserve the same direction of rotation. Other speed combinations may be obtained from other pole-numbered ratios of the cascaded motors, but it will be found that the 2:1 ratio provides the smoothest acceleration of the propulsion motors, with the variable-frequency circuit connected to the cascade connections as shown.

The above combinations are not restricted to the particular use shown in the drawing, as they may be employed for tying together alternating-current systems of any of the different frequency ratios, whether single-phase or polyphase, and with the power flowing in either direction, as in motoring or dynamic braking operation of the propulsion motor 7. It will be further understood that any improvement tending to perfect the phase-balancer operation of the aggregate may be incorporated in my invention. I desire, therefore, that only such limitations shall be placed upon the appended claims as are imposed by the particular language thereof or by the prior art.

I claim as my invention:

1. The combination with a plurality of alternating current systems, at least one of said systems being polyphase, a frequency-changing set for connecting said systems, said set comprising a pair of mechanically connected induction-machine units of different pole numbers, means for, at times, connecting said units in cascade with the first system connected to the larger-pole-number unit as the first member of the cascade and with the second system connected to the cascade connections, means for, at other times, connecting said units in cascade with the first system connected to the smaller-pole-number unit as the first member of the cascade and with the second system connected in reverse phase sequence to the cascade connections, means for, at still other times, connecting the primary winding of said larger-pole-number unit to said first system and short-circuiting the other winding thereof, connecting the formerly cascaded winding of the smaller-pole-number unit to said second system in the first phase sequence and energizing the other winding thereof to produce a backwardly rotating field corresponding to the line frequency of the first system, the direction of rotation of the set being unchanged throughout, and switching means for ensuring the concurrent completion and discontinuance of the several connections as specified.

2. The combination with an alternating-current system, a second alternating current system, said second system, at least, being polyphase, a frequency-changing set for connecting said systems, said set comprising a pair of mechanically connected induction-machine units of different pole numbers, means for, at times, connecting said units in cascade, with the first system connected to the larger-pole-number unit as the first member of the cascade and with the second system connected to the cascade connections, means for, at other times, connecting said units in cascade with the first system connected to the smaller-pole-number unit as the first member of the cascade and with the second system connected in reverse phase sequence to the cascade connections, means for, at still other times, connecting the primary winding of said larger-pole-number unit to said first system and short-circuiting the other winding thereof, connecting the formerly cascaded winding of the smaller-pole-number unit to said second system in the first phase sequence and energizing the other winding thereof to produce a backwardly rotating field corresponding to the line frequency of the first system, means for, at still other times, operating the arrangement last stated with the primary and secondary terminal connections of the smaller-pole-number unit both reversed, the direction of rotation of the set being unchanged throughout, and switching means for ensuring the concurrent completion and discontinuance of the several connections as specified.

3. The combination with an alternating-current system, a second alternating-current system, said second system, at least, being polyphase, a frequency changing set for connecting said systems, said set comprising a pair of mechanically connected induction-machine units of different pole numbers, means for, at times, connecting the primary winding of one of said units to said first system and short-circuiting the other winding thereof, connecting the primary winding of the other of said units to said second system and energizing the other winding thereof to produce a backwardly rotating field corresponding to the line frequency of the first system, means for, at other times, operating said arrangement with the secondary terminal connections of the said other of said units reversed, the direction of rotation of the set being unchanged throughout, and means for reversing the connections between the second alternating-current system and its associated primary winding when said secondary terminal connections are reversed.

4. The combination with an alternating-current system, a second alternating-current system, said second system at least, being polyphase, a frequency-changing set for connecting said systems, said set comprising a pair of mechanically connected induction-machine units of different pole numbers, means for, at times, connecting said units in cascade to the first system, while the second system connected to the cascade connections, means for, at other times, connecting said systems respectively to one winding of each of said unts, short-circuiting the other winding of one unit, and connecting the other winding of the remaining unit to the primary winding of the first unit, and switching means for ensuring the concurrent completion and discontinuance of the several connections as specified.

5. The combination of two induction-machine units having different pole numbers, a single-phase system operating on a constant frequency, a polyphase system operating on a plurality of different frequencies, switching means for, at times, connecting said two induction-machine units in cascade, connecting said polyphase system to the cascade connection and connecting alternately the one or the other of said units, as the first member of the cascade, to said single-phase system, switching means for, at other times, connecting one of said units as a phase balancer, single phase to said single-phase system and polyphase to said polyphase system, and switching means for, at still other times, connecting said units as a motor generator set with the motor connected to one system and the generator connected to the other system.

6. The combination of two induction-machine units having different pole numbers, a single-phase system operating on a constant frequency, a polyphase system operating on a plurality of different frequencies, switching means for, at times, connecting said two induction-machine units in cascade, connecting said polyphase system to the cascade connections and connecting alternately the one or the other of said units, as the first member of the cascade, to said single-phase system, switching means for, at other times, connecting one of said units as a phase balancer, single phase to said single-phase system and polyphase to said polyphase system, switching means for, at still other times, connecting said units as a motor generator set with the motor connected to one system and the generator connected to the other system, said generator unit being excited by polyphase currents derived from polyphase connections of said motor unit, and means for arranging the magnetic field of said generator unit to rotate, at times, in the direction of mechanical rotation of the generator and, at other times, in a direction opposite thereto.

7. The method of operating an induction motor from a source of constant-frequency current by means of a frequency-changing aggregate comprising two induction-machine units of different pole numbers, which consist in, at times, operating said two units in cascade, supplying said motor from the cascade connection of said units, at other times, operating said induction motor directly from said source of constant frequency, and at other times, operating one of said units as a motor supplied from said constant-frequency source and driving the second of said units as a generator supplying said induction motor.

8. The method of operating an induction motor from a source of constant-frequency current by means of a frequency-changing aggregate comprising two induction-machine units of different pole numbers, which consist in, at times, operating said two units in cascade, supplying said motor from the cascade connection of said units, using alternately the one and the other of said units as the first member of the cascade, at times operating said induction motor directly from said source of constant frequency and at other times operating one of said units as a motor supplied from said constant frequency source driving the second of said units as a generator supplying said induction motor, said generator being excited by polyphase currents of said constant frequency, rotating once in the direction of rotation of said generator and once in a direction opposite thereto.

9. The method of operating a polyphase induction motor from a source of single-phase constant-frequency current by means of a frequency-changing and phase-converting aggregate comprising two induction-machine units of different pole numbers, which consists in, at times, operating said two units in cascade, supplying said motor from the cascade connection of said units, using alternately the one and the other of said units as the first member of the cascade at different times in the operation of the aggregate and at other times operating said aggregate as a phase converter and supplying therefrom polyphase currents of said constant frequency to said induction motor.

10. The method of operating a polyphase induction motor from a single-phase constant-frequency supply by means of a frequency-changing and phase-converting aggregate comprising two induction-machine units of different pole numbers which consists in, at times, operating said two units in cascade, supplying said motor from the cascade connection of said units, using alternately the one and the other of said units as the first member of the cascade, at other times operating said aggregate as a phase converter and supplying therefrom polyphase currents of said constant frequency to said induction motor, and at still other times, operating said two units as a motor-generator set with the motor unit connected to said single-phase supply and the generator unit connected to said polyphase motor.

11. The method of operating a polyphase induction motor from a single-phase constant-frequency supply by means of a frequency-changing and phase-converting aggregate comprising two induction-machine units of different pole numbers which consists in, at times, operating said two units in cascade, supplying said motor from the cascade connection of said units, using alternately the one and the other of said units as the first member of the cascade, at other times, operating said aggregate as a phase converter and supplying therefrom polyphase current of said constant frequency to said induction motor, and at still other times operating said two units as a motor-generator set with the motor unit connected to said single-phase supply and the generator unit connected to said polyphase motor, said motor unit acting also as a phase converter supplying excitation currents to said generator unit.

12. The combination with supply line of substantially constant frequency, of a main induction motor and a frequency-changing mechanism for operating said induction motor at different speeds from said supply line, said mechanism comprising two induction-machine units having a pole-number ratio 2:1, main-circuit connecting means for, at times, connecting said units in cascade, with the supply line connected to the larger-pole-number unit as the first member of the cascade and with the motor connected to the cascade connections, main-circuit connecting means for, at other times, connecting said units in cascade, with the supply line connected to the smaller-pole-number unit as the first member of the cascade and with the motor connected in reverse phase sequence to the cascade connections, the direction of rotation of the set being unchanged, main-circuit means for, at still other times, operating said motor at line frequency from said supply line, main-circuit connecting means for, at still other times, operating said larger-pole-number unit as a motor connected to said supply line and driving the smaller-pole-number unit as a generator having one winding supplying said main induction motor, and having its other winding energized at line frequency to produce a backwardly rotating field, and a controller for effecting the several main-circuit connections.

13. The combination with a supply line of substantially constant frequency, of a main induction motor and frequency-changing mechanism for operating said induction motor at different speeds from said supply line, said mechanism comprising two induction-machine units having a pole-number ratio 2:1, main-circuit connecting means for, at times, operating said larger pole-number unit as a motor connected to said supply line and driving the smaller-pole-number unit as a generator having one winding supplying said main induction motor, and having its other winding energized at line frequency to produce a forwardly rotating field, main-circuit connecting means for, at other times, operating said combination with a backwardly rotating field and with the phase connections of said main induction motor reversed, main-circuit connecting means for, at still other times, operating said main induction motor at line frequency from said supply line, and a controller for effecting the several main-circuit connections.

14. The combination with a supply line of substantially constant frequency, of a main-induction motor and frequency-changing mechanism for operating said induction motor at different speeds from said supply line, said mechanism comprising two induction-machine units having a pole-number ratio 2:1, main circuit connecting means for, at times, connecting said units in cascade, with the supply line connected to the larger-pole-number unit as the first member of the cascade and with the motor connected to the cascade connections, main-circuit connecting means for, at other times, connecting said units in cascade with the supply line connected to the smaller-pole-number unit as the first member of the cascade and with the motor connected in reverse phase sequence to the cascade connections, the direction of rotation of the set being unchanged, main-circuit connecting means for, at still other times, operating said motor at line frequency from said supply line, torque-controlling means operative with respect to said main induction motor during each of the said arrangements of main-circuit connections, and means for preventing said main-circuit connections from being changed unless said torque-controlling means are in a low-torque position.

15. The combination with a supply line of substantially constant frequency, of a main induction motor and frequency-changing mechanism for operating said induction motor at different speeds from said supply line, main-circuit connecting means for causing said frequency-changing mechanism to operate said motor at any one of a plurality of materially different frequencies, torque-controlling means operative with respect to said motor during each setting of said main-circuit connecting means, and means for preventing said main-circuit setting from being changed unless said torque-controlling means are in a low-torque position.

16. The combination with a supply line of substantially constant frequency, of a main induction motor and a frequency-changing mechanism for operating said induction motor at different speeds from said supply line, main-circuit connecting means for causing said frequency-changing mechanism to operate said motor at any one of a plurality of materially different frequencies, torque-controlling means operative with respect to said motor during each setting of said main-circuit connecting means, a controller for varying the setting of said main-circuit connecting means, means for preventing said main-circuit setting from being changed unless said torque-controlling means are in a low-torque position, and means for causing said torque-controlling means to be actuated towards a low-torque position whenever said controller is moved to a new position.

17. The combination with an induction-motor driving means, of means comprising a controller for establishing various arrangements of main-circuit connections for causing said driving means to operate at a plurality of materially different speeds, torque-controlling means operative with respect to said motor means during each arrangement of main circuit connections, means for preventing said main-circuit connections from being changed, regardless of the position of said controller unless said torque-controlling means are in a low-torque position, means for causing said torque-controlling means to be actuated towards a low-torque position whenever said controller is moved to a new position, and means for automatically preventing said main-circuit connections from being changed if said controller is moved more than one step at a time.

18. The combination with an induction-motor driving means, of means comprising a controller for establishing various arrangements of main-circuit connections for causing said driving means to operate at a plurality of materially different speeds, torque-controlling means operative with respect to said motor means during each arrangement of main-circuit connections, means for preventing said main-circuit connections from being changed, regardless of the position of said controller unless said torque-controlling means are in a low-torque position, means for causing said torque-controlling means to be actuated towards a low-torque position whenever said controller is moved to a new position, said last-mentioned means comprising a set of auxiliary electro-magnetic switches corresponding to the successive positions of the controller, said controller having contact segments for energizing each of the respective auxiliary switches in one controller position only, holding circuits comprising interlocks on said auxiliary switches so arranged that no switch is de-energized, after having once been energized, until one of the next adjacent auxiliary switches is energized, and electromagnetic switching means actuated by the closure of said auxiliary switches for effecting the various main-circuit connections.

19. The combination with an induction-motor driving means, of means comprising a controller for establishing various arrangements of main-circuit connections for causing said driving means to operate at a plurality of materially different speeds, torque-controlling means operative with respect to said motor means during each arrangement of main-circuit connections, means for preventing said main-circuit connections from being changed, regardless of the position of said controller, unless said torque-controlling means are in a low-torque position, means for causing said torque-controlling means to be actuated towards a low-torque position whenever said controller is moved to a new position, said last-mentioned means comprising a set of auxiliary electro-magnetic switches corresponding to the successive positions of the controller, said controller having contact segments for energizing each of the respective auxiliary switches in one controller position only, holding circuits comprising interlocks on said auxiliary switches so arranged that no switch is de-energized, after having once been energized, until one of the next adjacent auxiliary switches is energized, electromagnetic switching means actuated by the closure of said auxiliary switches for effecting the various main-circuit connections, and interlocks associated with said electromagnetic switching means for preventing any arrangement of main-circuit connections from being established even after the corresponding auxiliary switch has been energized, until the main-circuit connections corresponding to all of the other running speeds are broken.

20. The combination with an induction-motor driving means, of means comprising a controller for establishing various arrangements of connections for causing said driving means to operate at a plurality of materially different speeds, and means for automatically preventing said connections from being changed if said controller is moved more than one step at a time.

21. The combination with an induction-motor driving means, of means comprising a controller for establishing various arrangements of connections for causing said driving means to operate at a plurality of materially different speeds, and means for automatically preventing said connections from being changed if said controller is moved more than one step at a time, said last-mentioned means comprising a set of auxiliary electromagnetic switches corresponding to the successive positions of the controller, said controller having contact segments for energizing each of the respective auxiliary switches in one controller position only, holding circuits comprising interlocks on said auxiliary switches so arranged that no switch is de-energized, after having once been energized, until one of the next adjacent auxiliary switches is energized, and electromagnetic switching means actuated by the closure of said auxiliary switches for effecting the various connections.

22. The combination with an induction-motor driving means, of means comprising a controller for establishing various arrangements of connections for causing said driving means to operate at a plurality of materially different speeds, and means for automatically preventing said connections from being changed if said controller is moved more than one step at a time, said last-mentioned means comprising a set of auxiliary electromagnetic switches corresponding to the successive positions of the controller, said controller having contact segments for energizing each of the respective auxiliary switches in one controller position only, holding circuits comprising interlocks on said auxiliary switches so arranged that no switch is de-energized, after having once been energized, until one of the next adjacent auxiliary switches is energized, electromagnetic switching means actuated by the closure of said auxiliary switches for effecting the various connections, and interlocks associated with said electromagnetic switching means for preventing any arrangement of connections from being established even after the corresponding auxiliary switch has been energized, until the connections corresponding to all of the other running speeds are broken.

In testimony whereof, I have hereunto subscribed my name this 2nd day of August 1923.

RUDOLF E. HELLMUND.